R. F. KLAASEN.
WIND BOARD GOVERNOR FOR THRESHING MACHINES.
APPLICATION FILED MAR. 14, 1908.
920,753.
Patented May 4, 1909.
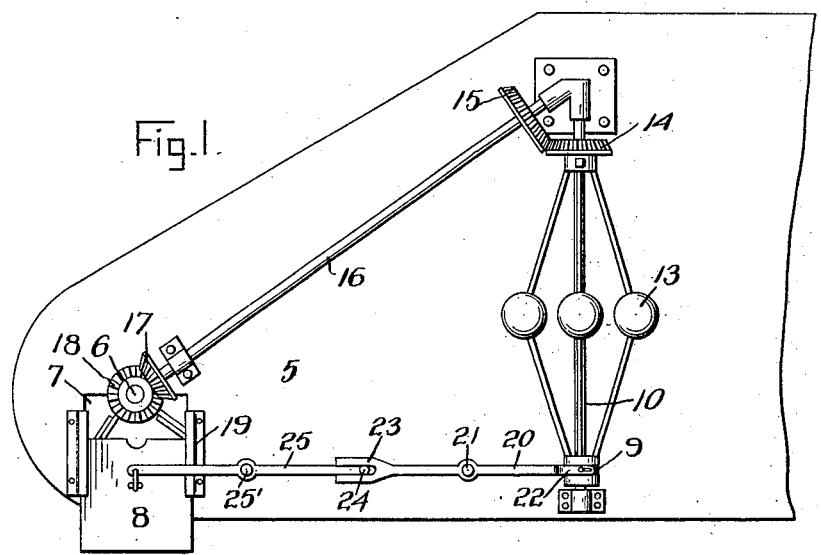
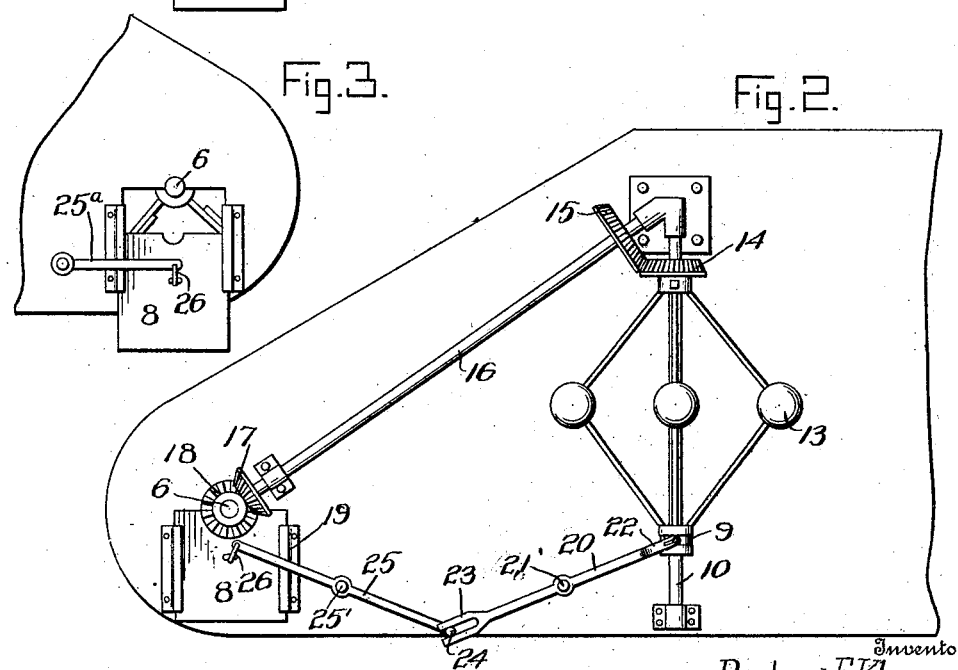
Witnesses
C. K. Reichenbach
H. G. Smith
Inventor
Richard F. Klaasen.
By Chandlee & Chandlee
Attorneys.

UNITED STATES PATENT OFFICE.

RICHARD F. KLAASEN, OF GEORGE, IOWA.

WIND-BOARD GOVERNOR FOR THRESHING-MACHINES.

No. 920,753.　　　Specification of Letters Patent.　　　Patented May 4, 1909.

Application filed March 14, 1908. Serial No. 421,075.

*To all whom it may concern:*

Be it known that I, RICHARD F. KLAASEN, a citizen of the United States, residing at George, in the county of Lyon, State of Iowa, have invented certain new and useful Improvements in Wind-Board Governors for Threshing-Machines; and I do hereby declare the following to be a full, clear, and exact description of the invention, such as will enable others skilled in the art to which it appertains to make and use the same.

This invention relates to wind board governors for threshing machines.

In a threshing machine, it is desirable and in fact imperative if the best results are to be obtained, that some means be provided for regulating the force of the wind blast in proportion to the speed of the threshing mechanism. When grain to be threshed is fed in large quantities and rapidly into the machine the speed of the threshing mechanism is necessarily reduced and unless the speed of the blast is increased, there will not be sufficient force of blast to separate the chaff from the threshed grain. On the other hand, when grain is fed slowly and in small quantities into the machine, the speed of the threshing mechanism will be increased and unless the speed of rotation of the fan is correspondingly reduced, such a great blast will be the result that a portion of the threshed grain will be blown, together with the chaff, into the chaff discharge of the machine.

In carrying out my invention I have provided a governor which is driven from the fan shaft and which has operative connection with the wind board of the machine to raise or lower it according as to whether the fan shaft is rotating at a high or low rate of speed.

In the accompanying drawings, Figure 1 is a side elevation of the mechanism, parts being shown in normal position, Fig. 2 is a similar view but showing the position of the parts when the governor is rapidly rotated, and, Fig. 3 is a fragmentary view of the opposite side of the threshing machine.

In the drawings, there is shown the casing 5 of a fan blower, the fan shaft being indicated by the numeral 6 and the air intake opening in the sides of the casing by the numeral 7, the size of these openings being regulated by the usual wind board 8. A governor of the ordinary centrifugal type is mounted adjacent the fan shaft 6 and comprises the usual vertically movable collar 9 slidable vertically upon a stem 10, to which are connected the lower ends of the lower links of the governor. At the point of junction of the upper and lower links, there is provided the usual centrifugal balls 13. A gear 14 is fixed to the upper collar of the governor and meshing with this gear for the purpose of driving the same and operating the governor is a gear 15 at the upper end of an oblique shaft 16. A gear 17 is fixed upon one end of the fan shaft 6 and a similar gear 18 is fixed upon the shaft 16 at the lower end thereof and meshes with the said gear 17, it being understood that in this manner, the governor is driven from the fan shaft of the blower.

As is usually the case, the wind board 8 is mounted for vertical sliding movement in suitable guides 19 and in order that it may be so moved, I have provided such connections between it and the vertically movable collar 9 of the governor as will now be described. A rocking lever 20 is pivoted as at 21 to a convenient part of the frame of the threshing machine and has connection by means of a yoke 22, at one of its ends, with the collar 9 of the governor whereby when the stem is raised or lowered the lever will be rocked. The opposite end of the collar is forked as at 23 and in the fork works a pin 24 carried at one end of a similar lever 25 which is fixed at one end of a rock shaft 25′ journaled transversely upon the frame of the machine, there being a similar lever 25$^a$ fixed at the other end of this rock shaft. The free ends of the two levers 25 and 25$^a$ are connected by means of links 26 with the wind board at the side of the blower.

From the foregoing description of my invention it will be understood that when the threshing mechanism is rotating rapidly, the governor collar 9 will raise and rock the lever 21 to the position shown in Fig. 2 of the drawings. That end of the lever 25 at which the pin 24 is rotated will then be swung downwardly and its opposite end and the corresponding end of the lever 25$^a$ raised, lifting to a corresponding degree the wind board 8, thereby closing to the proper degree the air intake opening 7 through the blower casing. The reverse is true when the threshing mechanism is rotating at a slow rate of speed, the parts then assuming substantially the position shown in Fig. 1 of the drawings.

What is claimed, is:—

The combination with a wind chest having inlets on opposite sides thereof, sliding doors controlling said inlets, and a blower working in said chest; of a governor driven from the blower, a rock shaft journaled transversely in the walls of the wind chest, a rock lever having one arm journaled upon said rock shaft at one end thereof, a second lever having two arms journaled on the opposite end of the rock shaft, one of the arms being equal in length to and extending from the rock shaft in the same direction as the first mentioned lever, the other arm extending in a direction opposite thereto, a third lever operatively connected to the second lever and the governor and pivoted intermediate its ends, a link connecting the end of the first mentioned lever with one of said doors, and a second link connecting the end of the first arm of the second lever to the other door, said levers being arranged to move said doors simultaneously and equally.

In testimony whereof, I affix my signature, in presence of two witnesses.

RICHARD F. KLAASEN.

Witnesses:
 SIMON FISHER,
 ELIZABETH KEMPLAY.